(No Model.) 2 Sheets—Sheet 2.
J. ATKINS.
VEHICLE SHAFTS.
No. 475,916. Patented May 31, 1892.
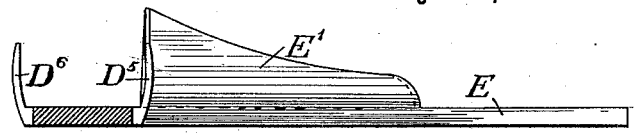
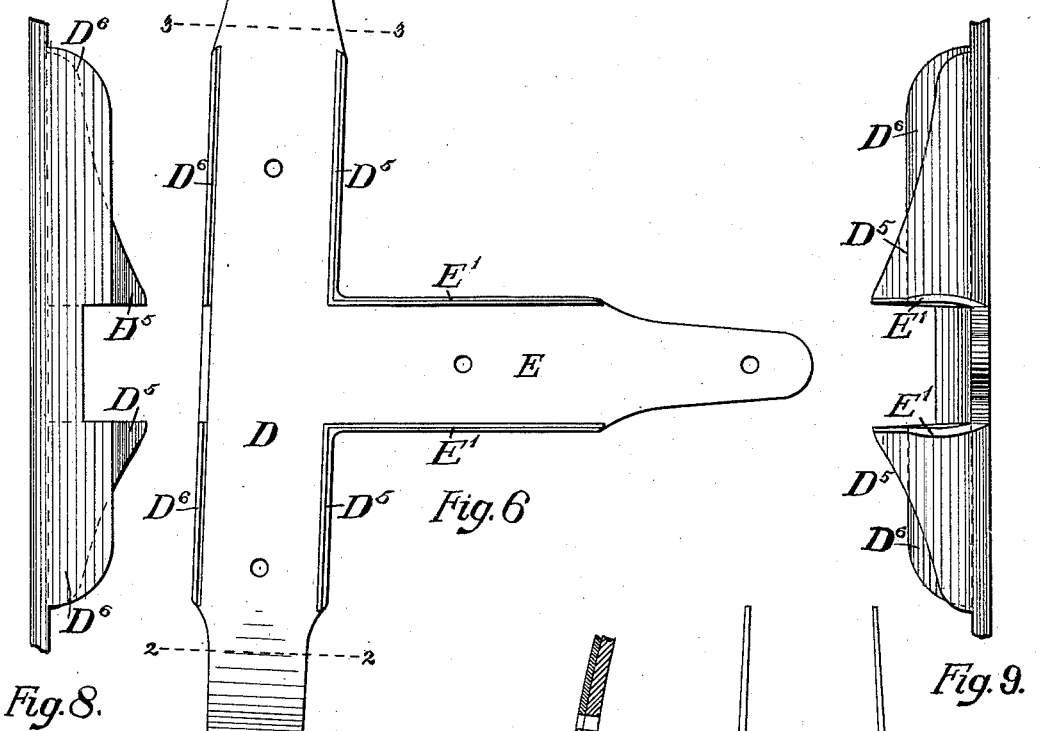
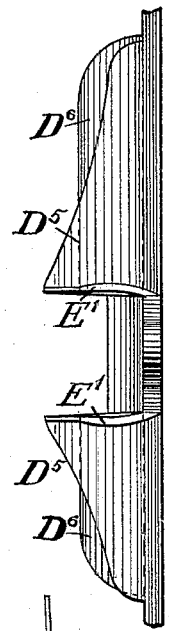
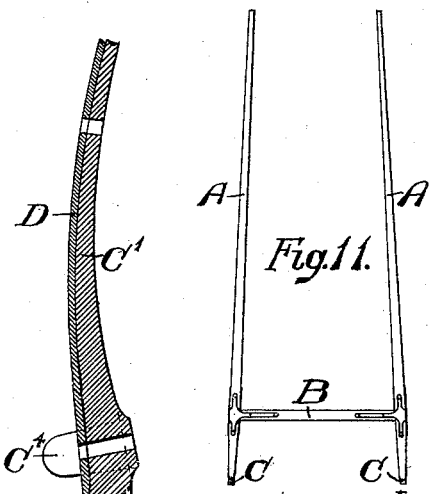
Attest:
Wm. Ea Jones
K. Smith
Inventor:
John Atkins
her Wm. Hubbell Fisher
Attorney.

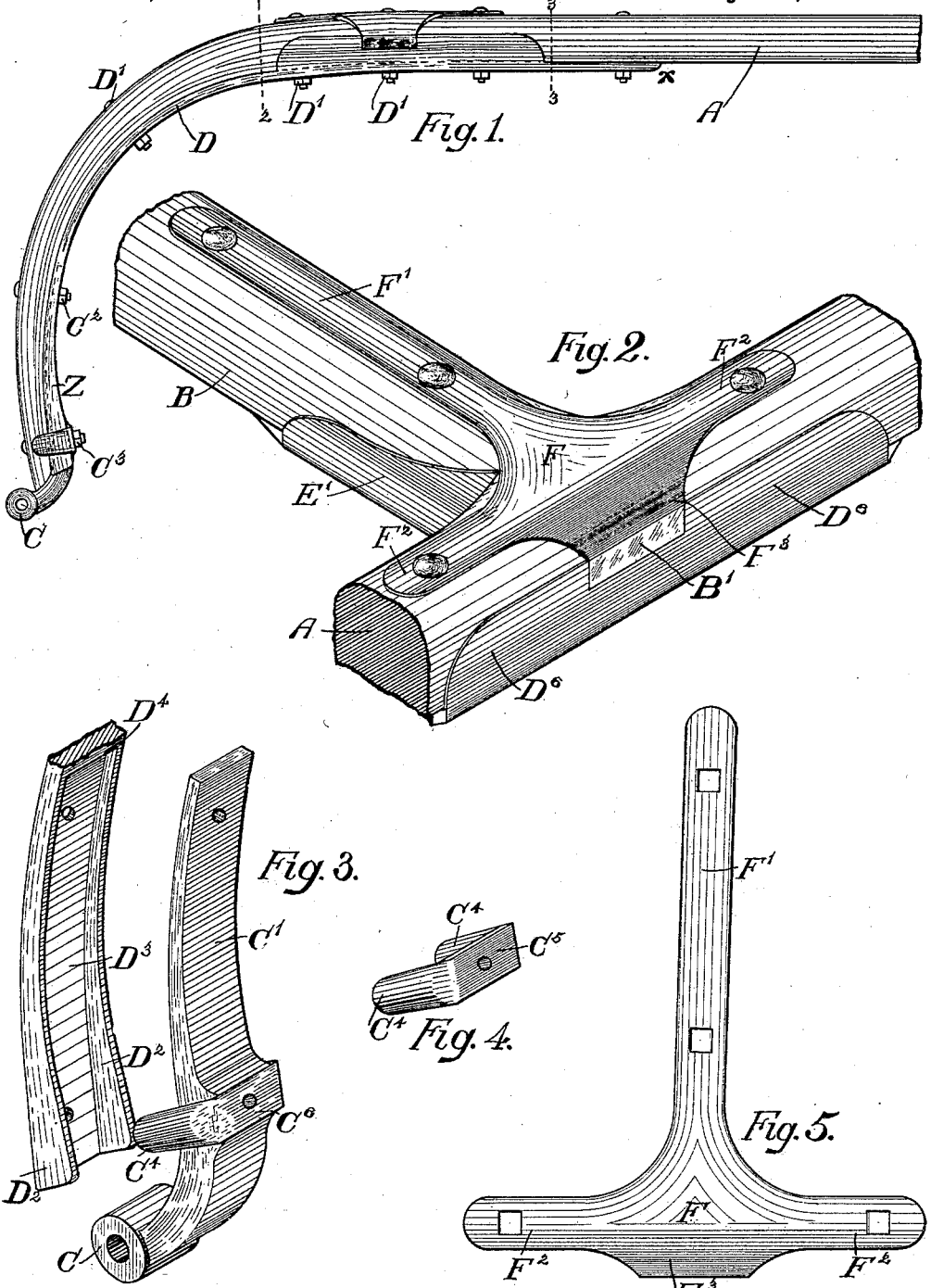

UNITED STATES PATENT OFFICE.

JOHN ATKINS, OF CINCINNATI, OHIO.

VEHICLE-SHAFT.

SPECIFICATION forming part of Letters Patent No. 475,916, dated May 31, 1892.

Application filed November 17, 1891. Serial No. 412,160. (No model.)

*To all whom it may concern:*

Be it known that I, JOHN ATKINS, a citizen of the United States, and a resident of the city of Cincinnati, in the county of Hamilton and State of Ohio, have invented certain new and useful Improvements in Vehicle-Shafts, of which the following is a specification.

The several features of my invention and the various advantages resulting from their use, conjointly or otherwise, will be apparent from the following description and claims.

In the accompanying drawings, forming a part of this specification and to which reference is hereby made, Figure 1 is a side elevation illustrating my invention as applied to a shaft and the cross-bar thereof. Fig. 2 is an isometric view of a detached portion of the side piece of either of the shafts between the lines 2 2 and 3 3 of Fig. 1 and showing a portion of the cross-bar connecting the shafts. This figure illustrates more fully than Fig. 1 my improvements in the usual irons applied to a pair of shafts. Fig. 3 illustrates my detachable eye and accompanying piece and tongue shown in isometric view detached from the lower end of the under metal strip. Fig. 4 shows the flanges separated from the eye-tongue piece and connected by a metal strip. Fig. 5 is a plan view of the upper T-plate. Fig. 6 is a plan view of the under metal strip. Fig. 7 is a view of that portion of Fig. 6 above line 2 2. Fig. 8 is a view of the left side of Fig. 6 between lines 2 2 and 3 3. Fig. 9 is a view of the right side of the same. Fig. 10 is a sectional view of the lower end of the under metal strip and detachable eye and its accompanying piece and tongue. Fig. 11 is a diagram of a pair of shafts and accompanying cross-bar complete.

Each shaft is indicated by the letter A. The shafts are of wood and are connected near their rear ends by the wooden cross-bar B. The common means for connecting this cross-bar B to the shaft consist of the tenon and mortise, which I preferably employ.

C indicates the eye, which belongs to the shaft and which forms part of the coupling whereby the shaft is pivotally connected to a vehicle.

Heretofore it has been customary to form the eye C integral with a thin strip of iron which was applied to the under side of the shaft and extends over its rear end forward as far as $x$ in Fig. 1, this strip being firmly attached to the shaft by means of suitable bolts, the eye C being located substantially as shown in Fig. 1. The eye C, instead of being integral with said strip of iron, was frequently welded thereto at the part marked Z in Fig. 1. When through use of the vehicle the eye C became worn out or broken, it and the strip integral with it had to be removed from the vehicle and a new strip having a new eye was applied in its place, or the worn-out eye was cut off of the old strip and a new eye was welded thereto. Such changes of parts involved a considerable expenditure of time, labor, and money. One feature of my invention enables me to replace the eye C when worn out or broken without removing this iron strip.

The construction embodying this feature of my invention is as follows: D is a suitable strip of metal applied to the under side of the shaft and secured thereto by means of bolts D', substantially as shown, the bolts passing through the iron strip D and the shaft A and secured in place in the ordinary manner. The rear end of the strip D is provided with flanges $D^2 D^2$, forming a recess $D^3$.

The eye C is provided with a tongue C', the tongue and the eye being firmly united together and preferably in one piece. When in place, the tongue C' lies in the recess $D^3$ and fits closely between the flanges $D^2 D^2$. Bolts $C^2 C^3$ pass through the tongue C' and the strip D and the shaft A, securing these three parts firmly together. In cases where the eye becomes worn out or broken the tongue can be readily removed by loosening the two bolts $C^2 C^3$, and without disturbing the strip D and the shaft A a new eye with a tongue can be applied in place of the worn-out eye. To more firmly brace the tongue in position, I provide a flange $D^4$ at the upper end of the recess $D^3$, and the upper end of the tongue C' when in place abuts against this flange $D^4$.

In practice it has been found that that end portion of the wooden shaft which is near to the eye C frequently splits and the crevice formed by the split gradually runs up the heel of the shaft and in time renders the shaft useless.

In connection with the tongue C', I have provided a device whereby the tongue may be yet more firmly braced to the strip D and the shaft A and at the same time prevent the shaft from splitting. This device consists of the lugs $C^4 C^4$, one lug located at one side edge of the tongue $C'$ and the other lug located at the other side edge of the tongue $C'$. When the tongue $C'$ is in place in the recess $D^3$, these lugs $C^4 C^4$, respectively, cross adjacent sides of the flanges $D^2 D^2$ and extend over a part of the adjacent side of the shaft A. The lugs are capable of being bent, and after the tongue $C'$ has been bolted in position the free end of each lug is hammered or otherwise bent around and upon the shaft A. It this way the shaft is prevented from being split, and the tongue $C'$, the strip D, and the shaft A are firmly held together.

In practice the tongue $C'$ will be made of wrought or malleable iron. When made of wrought-iron, it will ordinarily be made by drop-forging, and in such event the lugs $C^4 C^4$ will be preferably formed in one piece, and when the tongue is made of malleable iron the lugs will preferably be cast separately, and in such event will be united at their backs by a cross-piece $C^5$, substantially as shown in Fig. 4. In the latter case, when the lugs are applied to the tongue, the cross-piece $C^5$ will lie upon the back of the tongue at $C^6$, bolt $C^3$ passing through the back of the cross-piece $C^5$, as well as the tongue $C'$ and the strip D and shaft A.

To more firmly and rigidly secure the cross-bar B to the shaft A, I unite with the strip D a strip E, which latter strip extends under the cross-bar B and is bolted thereto and is provided with vertical flanges $E' E'$, between which the end portion of the cross-bar adjacent to the shaft is firmly secured. The strip D is likewise provided with vertical flanges $D^5$, one on each side of the adjacent end of the cross-bar. Each flange is in one piece or otherwise rigid with its adjacent flange $E'$. In this way the flanges $D^5$ and $E'$ combine to form an extremely rigid and secure brace for the shaft and cross-bar B at their junction.

For further securing the shaft firmly in place in relation to the cross-bar and enabling the cross-bar to form with each shaft a strong and rigid structure I provide each strip D with an outside vertical flange $D^6$, and the shaft A fits closely between the flanges $D^6$ on the one side and the opposite flanges $D^5$ on the other.
On the top of the cross-bar B and the adjacent top portion of the shaft A is secured a T-plate F, having a main shank $F'$ bolted to the cross-bar B and having the arms $F^2 F^2$ resting upon and bolted to the shaft A. It may be here remarked that the bolts whereby the strip E is connected to the shaft A are also preferably employed to perform the additional function of connecting the shank $F'$ and the T-plate to the said cross-bar, and the bolts whereby the strip D between the flanges $D^6$ and $D^5$ are connected to the shaft A are also employed to connect the arms $F^2$ $F^2$ to the shaft A. That end of the T-plate which is adjacent to the outside of the shaft is lengthened into a flange $F^3$, which extends upon, down, and around the shaft A as far as the tenons of the cross-bar. Thus the cross-bar and shaft are rigidly and strongly united together by upper and lower clamps, between which said cross-bar and shaft are embraced.

It may be remarked that my invention is simple in construction, readily made, and very efficient, convenient, and serviceable in use. It is applicable to the ordinary shafts in common use and does not require any special stock or description of wood-work other than the well-known forms now in common use by the public.
The strip D and flanges and the T-plate, with flange, and the eye C, tongue $C'$, and lugs are of metal and will be made, preferably, either of wrought or malleable iron.

What I claim as new and of my invention, and desire to secure by Letters Patent, is—

1. In a shaft, the combination of the wooden portion A, strip D, having flanges $D^2 D^2$, and the eye C, provided with tongue $C'$, receivable between said flanges, and the lugs $C^4 C^4$, substantially as and for the purposes specified.

2. In a shaft, the combination of the strip D, having recess $D^3$, and the eye C, provided with tongue $C'$, receivable into said recess, and the lugs $C^4 C^4$, substantially as and for the purposes specified.

3. In a shaft, the combination of the strip D, having recess $D^3$, and the eye C, provided with tongue $C'$, receivable into said recess, and the lugs $C^4 C^4$, which, when the tongue $C'$ and the shaft A are combined together, are bent upon the said shaft, substantially as and for the purposes specified.

4. In a vehicle-shaft, the combination of the eye C, having the tongue $C'$, strip D, having recess $D^3$, receiving the said tongue and having shaft A, and lugs $C^4 C^4$, connected by the cross-piece $C^5$, resting upon the tongue and secured to the latter by the bolt $C^3$, which at that point unites the tongue, strip, and shaft A together, the lugs being bent upon the shaft A, substantially as and for the purposes specified.

JOHN ATKINS.

Attest:
W<span>M</span>. E. JONES,
K. SMITH.